Jan. 28, 1941.                O. WERNER                2,229,950
ARRANGEMENT FOR CONTROLLING THE VOLTAGE OF ALTERNATING CURRENT CIRCUITS
Filed March 7, 1940

WITNESSES:
E. F. Oberheim
Mr. C. Groome

INVENTOR
Otto Werner
BY
Franklin E. Hardy
ATTORNEY

Patented Jan. 28, 1941

2,229,950

UNITED STATES PATENT OFFICE 2,229,950

ARRANGEMENT FOR CONTROLLING THE VOLTAGE OF ALTERNATING CURRENT CIRCUITS

Otto Werner, Berlin-Klein-Machnow, Germany, assignor to Westinghouse Electric & Manufacturing Company, East Pittsburgh, Pa., a corporation of Pennsylvania Application March 7, 1940, Serial No. 322,799
In Germany February 14, 1939

4 Claims. (Cl. 171—242)

This invention relates to means for controlling the voltage drop across reactance devices of the saturable core type in which unidirectional fluxes are superimposed on the alternating current fluxes in the core structure.

In accordance with the invention, reactors of the saturable core type may be reduced to two-thirds of the size of those usually employed by causing the direct current that is used to establish the superimposed unidirectional flux to flow through the alternating current winding of the reactance device instead of through the usual direct current saturating winding.

It is an object of my invention to provide a variable reactor of the saturable core type in which the unidirectional current for controlling the magnetic saturation of the core is superimposed on the alternating current winding of the reactor.

It is a further object of the invention to provide a variable reactor of the above indicated type in which the unidirectional current for controlling the magnetic saturation of the core is derived from the alternating current circuit that is being controlled by the reactor.

Figure 1:
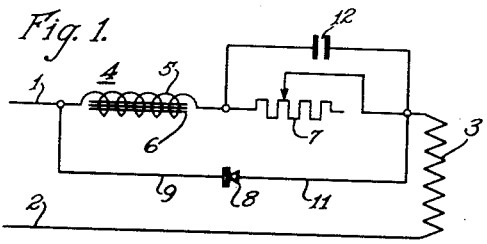
Figure 3:
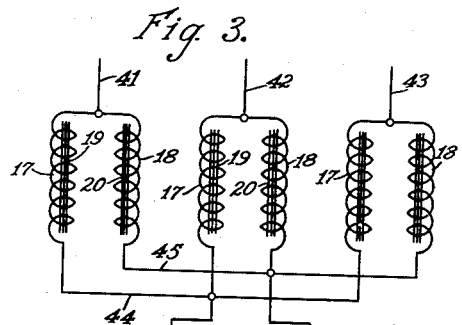
Figure 2:
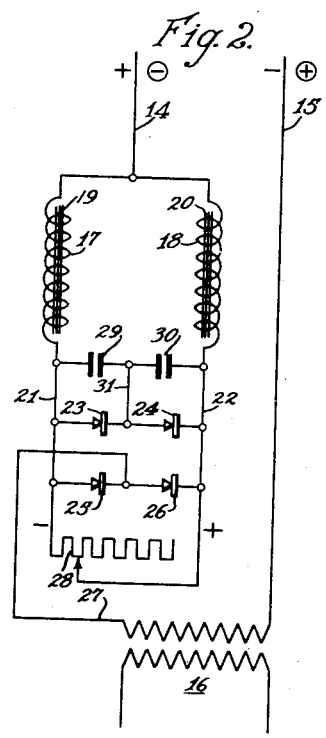
Figure 4:
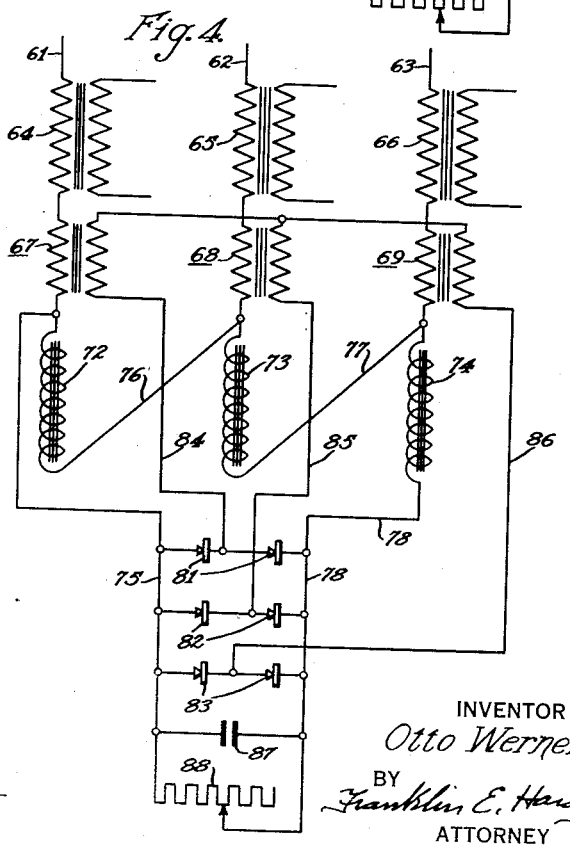

Other objects and advantages of the invention will be apparent from the following description of certain preferred embodiments thereof, reference being had to the accompanying drawing, in which:

Figure 1 is a diagrammatic view of circuit and apparatus illustrating one embodiment of the invention, and Figs. 2, 3, and 4 are diagrammatic views of various modified forms of the invention.

Referring to Figure 1 of the drawing, a simplified circuit is illustrated in which electrical energy is supplied from a source represented by conductors 1 and 2 to a load device 3 as controlled by a reactance device 4 having a winding 5, connected in circuit with the load device, and a core 6 of magnetic material inductively related to the winding 5. The reactive voltage drop across the winding 5 is controlled by varying the degree of saturation of the magnetic material of the core by controlling the flow of a unidirectional component of current through an impedance 7 that is shown as a resistor connected in series circuit relation with the winding 5. An electric valve 8 shown as a dry type rectifier element is connected by conductors 9 and 11 in parallel circuit relation to the series circuit including the winding 5 and the resistor 7. The impedance of the rectifier 8 is dependent upon the polarity of voltage applied to it, the rectifier permitting the ready flow of current from conductor 11 to conductor 9 and offering a high impedance to the flow of current in the opposite direction. One-half wave of the alternating current flowing through the winding 5 is, therefore, larger than the other half wave, thus establishing a unidirectional flow of current through the winding 5 produced by the predominating or larger half wave for controlling the degree of saturation of the core 6. This predominating half wave or effective unidirectional current through the winding 5 may be regulated by varying the impedance 7 to control the voltage impressed across the rectifier 8. A capacitor 12 is connected in shunt relation to the impedance element 7 and in series circuit relation with the winding 5 in order that the variation in the value of the resistor 7 will effect only the unidirectional component of current through the winding 5 and permit the alternating current component to be substantially unaffected.

Fig. 2 illustrates circuits and apparatus comprising a practical application of the principle illustrated in Fig. 1 in which alternating current is supplied from the circuit conductors 14 and 15 to a load device represented by the transformer 16 in which the reactance device for controlling the circuit consists of two windings 17 and 18 connected in parallel circuit relation to each other in the alternating current circuit and associated with cores 19 and 20, respectively, shown as separate core structures. The windings 17 and 18 are connected at one end directly to the alternating current conductor 14 and at their opposite ends two conductors 21 and 22, respectively, between which two sets of rectifier units are illustrated as connected, one set comprising the units 23 and 24 and the other set comprising the units 25 and 26. The midpoint between the rectifiers 25 and 26 is connected by conductor 27 to the load device 16 and through it to the other alternating current supply conductor 15. A regulating impedance shown as a resistor 28 is connected in parallel relation to the two sets of rectifier units between conductors 21 and 22. In addition, condensers 29 and 30 are also connected in parallel to the rectifier units 23 and 24, respectively, the conductor 31 connecting the midpoints between the two condensers and the two rectifiers of the set. The condensers 29 and 30 prevent the potential across the rectifier units from becoming too high.

During the half cycle in which the conductor 14 is positive and the conductor 15 is negative, current will flow through the winding 17 of the reactance device and the rectifier 25 to the conductor 27 and through the load device 16 to the conductor 15. Since this current flow is appreciable, the voltage drop across the winding 17 is appreciable. Since, however, the rectifier 26 prevents the flow of current from conductor 14 through winding 18 to conductor 27 during this half cycle of operation, the voltage drop across the winding 18 is small, thus maintaining the conductor 22 at substantially the same potential as the conductor 14 or positive with respect to the conductor 21. Current through the resistor 28 will therefore flow from conductor 22 to the conductor 21 and also through the windings 18 and 17. During the half cycle of operation in which the conductor 15 is positive with respect to the conductor 14, current will flow from the conductor 15 through the load device 16, conductor 27, rectifier 26, and reactor winding 18 to the conductor 14. During this half cycle of operation the voltage drop across the winding 18 is appreciable while the voltage drop across the winding 17 is slight so that the potential of the conductor 21 is substantially the same as the conductor 14. However, since the conductor 22 is positive with respect to the conductor 21, current flows during both half cycles of the alternating current wave from the conductor 22 to the conductor 21 both through the resistor 28 and through the windings 18 and 17 in series. The greater the value of the impedance 28 the greater will be the potential difference between conductors 22 and 21, and consequently the greater will be the flow of unidirectional current through the windings 18 and 17 for controlling the degree of saturation of the core members 19 and 20 which, in turn, control the reactive drop across the windings 17 and 18.

Fig. 3 shows an arrangement of circuits and apparatus for applying regulating reactance devices to polyphase circuits. The reactance devices having windings 17 and 18 are connected in circuit with each of the three phase circuit conductors 41, 42, and 43 in the same manner as shown in Fig. 2, the opposite ends of the windings being connected to conductors 44 and 45 between which three sets of dry type rectifier units are connected, each unit consisting of two rectifiers 46, 47; 48, 49; and 50, 51, respectively. The outgoing three phase conductors 52, 53, and 54 are, respectively, connected from a point between the two rectifier units of each set. The condenser 55 is connected between the conductors 44 and 45 and a regulating impedance shown as a resistor 56 is likewise connected between conductors 44 and 45 in parallel relation to the condenser 55 and to the three sets of rectifier units. The condenser 55 and the impedance device 56 perform functions similar to the condensers 29 and 30 and the impedance device 28 shown in Fig. 2 to control the potential between conductors 44 and 45 to control the flow of unidirectional current through the windings 18 and 17 in series for varying the magnetic saturation of the core structures 19 and 20.

In Fig. 4 another arrangement of circuits and apparatus suitable for use with a three phase system is illustrated in which one reactor winding only is connected in each phase of the polyphase circuit. In the drawing the three phase conductors 61, 62, and 63 are connected directly to the primary windings 64, 65, and 66, respectively, of transformers representing load devices, and also the primary windings of series transformers 67, 68, and 69. The three reactance devices comprising windings 72, 73, and 74 and their associated saturable cores are connected in a polygon network in delta relation between the three phase circuit conductors through conductors 75, 76, 77, and 78 and including in this network circuit three sets of electric valves or dry type rectifiers 81, 82, and 83, each set consisting of two rectifiers to the midpoint of which conductors 84, 85, and 86, respectively, are connected for supplying alternating current thereto from the secondary windings of the series transformers 67, 68, and 69. The alternating current from the series transformers develops a unidirectional current which flows from the rectifier units 81, 82, and 83 through the reactor windings 74, 73, and 72 in series for the purpose of supplying a unidirectional saturating component to these devices. As in the other illustrated embodiments, a capacitor 87 and a variable impedance device shown as a resistor 88 are connected in parallel relation to the rectifier units between conductors 75 and 78. The impedance device 88 may be varied for the purpose of controlling the amount of unidirectional current flowing from the rectifiers through the network circuit including windings 72, 73, and 74.

It will be apparent to one skilled in the art that other modifications of circuits and apparatus from those described may be made within the spirit of my invention, and I do not wish to be limited otherwise than by the scope of the appended claims.

What is claimed is:

1. In combination, an alternating current circuit to be regulated, reactance means for controlling the flow of current in said circuit and comprising two reactor windings connected in parallel in the alternating circuit and each provided with a core of magnetic material, and means for varying the reactance of said reactance means comprising means for circulating unidirectional current through the two reactor windings in series.

2. In combination, an alternating current circuit to be regulated, reactance means for controlling the flow of current in said circuit and comprising two reactor windings connected in parallel in the alternating circuit and each provided with a core of magnetic material, and means for varying the reactance of said reactance means comprising rectifier units connected between said reactor windings for supplying unidirectional current in opposite directions therethrough.

3. In combination, an alternating current circuit to be regulated, reactance means for controlling the flow of current in said circuit and comprising two reactor windings connected in parallel in the alternating circuit and each provided with a core of magnetic material, means for varying the reactance of said reactance means comprising dry type rectifier units connected between said reactor windings for supplying unidirectional current in opposite directions therethrough, and variable impedance means connected in parallel circuit relation to the rectifier units.

4. In combination, an alternating current circuit to be regulated, reactance means for controlling the flow of current in said circuit and comprising two reactor windings connected in parallel in the alternating circuit and each provided with a core of magnetic material, means for varying the reactance of said reactance means comprising dry type rectifier units connected between said reactor windings for supplying unidirectional current in opposite directions therethrough, variable impedance means connected in parallel circuit relation to the rectifier units, and electric capacitors connected in parallel circuit relation to the rectifier units and the variable impedance means.

OTTO WERNER.